Feb. 17, 1931.  J. F. D'EWART  1,792,575
SEAL RING FOR LOCKING SERVICE COCKS
Filed Jan. 28, 1928
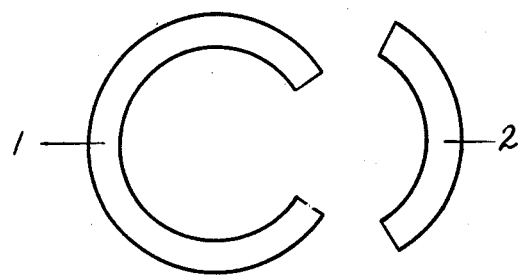
Fig. I   Fig. II
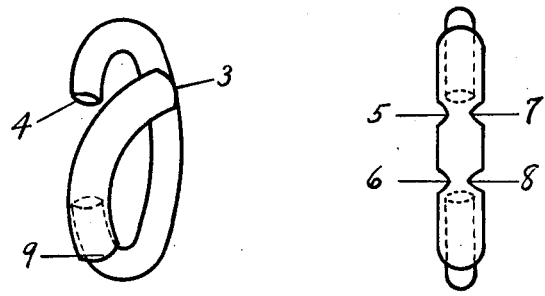
Fig. III   Fig. IV
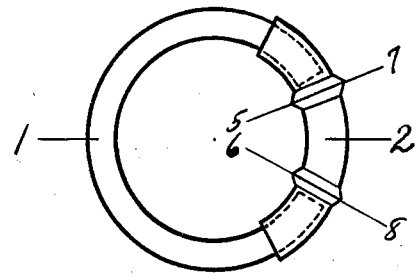
Fig. V
INVENTOR.
BY Jerome F. D'Ewart
ATTORNEYS.

Patented Feb. 17, 1931

1,792,575

UNITED STATES PATENT OFFICE

JEROME F. D'EWART, OF SAN FRANCISCO, CALIFORNIA

SEAL RING FOR LOCKING SERVICE COCKS

Application filed January 28, 1928. Serial No. 250,321.

My invention relates to a seal ring, more particularly adapted for locking service cocks used by gas and water companies.

The objects of my invention are: first, to provide a strong seal for locking service cocks; second, to provide a seal of this class at a very low cost of construction; third, to provide a seal for this purpose that shall be simple of construction and easy to use; fourth, to provide a seal of this class that cannot be removed by anyone without cutting the seal, and to do this will require a strong pair of pincers or other device for cutting metal, thus preventing its easy removal by unauthorized parties.

I attain these objects by the mechanism illustrated in the accompanying drawings, in which—

Figure I is a side view of the metal ring.

Figure II is a side view of the metal tube used for sealing the ring.

Figure III is a perspective view of the ring with the sealing tube ready to slide into position for sealing the ring.

Figure IV is an edge view of the ring with the sealing tube in position and with the sides of the tube crimped or indented for the purpose of locking the seal permanently in place.

Figure V is a side view of the ring with the sealing tube locked in its permanent position.

Similar numerals refer to similar parts throughout the several views.

Referring to the drawings; my seal-ring preferably comprises an open ring 1 conveniently made of round wire, or metal rod, with an opening or segment large enough to permit the ring 1 to be easily slipped through the rings of a lock-wing cock or through the rings of a service clamp. To close the open segment of the ring 1 and to seal the ring 1, a piece of metal tubing 2 is provided. This tubing 2 is preferably at least two times as long as the length of the open segment of the ring 1 and usually does not cover the ring 1 over a segment of more than one hundred and fifty degrees. The inside diameter of the metal tubing 2 is for convenience in assembly usually made approximately twenty per cent greater than the diameter of the metal rod of which the ring 1 is made.

To operate this seal ring 1, the metal tubing 2 is slipped onto the ring 1 as illustrated in Figure III. The tubing 2 is then slid around on the ring 1 until the end 3 of the tubing 2 passes by the end 4 of the ring 1. The tubing 2 is then slid back over the end 4 of the ring 1 preferably until the tubing 2 covers an equal amount of both ends of the ring 1. With the tubing 2 in this position a pair of strong narrow pincers are utilized to crimp or indent the tubing 2 on the sides at points 5, 6, 7, 8, between and close to the ends of the open ring 1. These indentations 5, 6, 7, 8, are preferably placed in a plane parallel to the plane of the ring 1. Where the open segment of the ring 1 is small in comparison to the size of the circumference of the ring 1 the tubing can be made long enough so that only indentations at one point in the tubing 2 will be necessary to lock it securely onto the ring 1.

To remove the tubing 2 from the ring 1 it will be necessary to cut the tubing 2 with a pair of pincers or other device for cutting metal and then slide the ends 3—9 of the tubing 2 off of the ring 1.

Having thus described my invention, what I claim as new and desire to secure by Letters Patent is:

1. A seal comprising an interrupted ring having spaced ends, a sleeve fitting over both of said ends, and a deformed portion of said sleeve between said ends for resisting relative displacement of said ring and said sleeve.

2. A seal comprising a circular ring having an interrupted portion between two facing ends and a tube overlying both of said ends and spanning said interrupted portion, said tube being crimped into the space intermediate said ends.

3. A seal comprising an interrupted ring having spaced ends, and a sleeve adapted to be telescoped over each of said ends and to be deformed to provide means for resisting telescoping movement of said ring and sleeve.

In testimony whereof, I affix my signature.

JEROME F. D'EWART.